(12) United States Patent
Jessup et al.

(10) Patent No.: US 9,232,041 B2
(45) Date of Patent: *Jan. 5, 2016

(54) SYSTEM AND METHOD FOR SENDING LOCAL INFORMATION FROM A WIRELESS BROWSER TO A WEB SERVER

(71) Applicant: INTEL CORPORATION, Santa Clara, CA (US)

(72) Inventors: Raymond K. Jessup, Santee, CA (US); John Dinh, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,043

(22) Filed: Dec. 24, 2014

(65) Prior Publication Data

US 2015/0111546 A1    Apr. 23, 2015

Related U.S. Application Data

(63) Continuation of application No. 14/220,720, filed on Mar. 20, 2014, now Pat. No. 8,971,864, which is a continuation of application No. 13/316,357, filed on Dec. 9, 2011, now Pat. No. 8,761,740, which is a (Continued)

(51) Int. Cl.
| | | |
|---|---|---|
| *H04M 1/725* | (2006.01) | |
| *G06F 17/30* | (2006.01) | |
| *H04W 4/02* | (2009.01) | |
| *H04W 64/00* | (2009.01) | |

(52) U.S. Cl.
CPC ....... *H04M 1/72561* (2013.01); *G06F 17/3087* (2013.01); *H04W 4/02* (2013.01); *H04W 64/00* (2013.01)

(58) Field of Classification Search
CPC ............ H04M 1/72583; H04M 7/003; H04M 1/72561; H04M 1/605; H04M 1/72547; H04M 2250/70; H04M 1/274558; H04M 1/72572; H04M 2001/274541; H04M 3/4931; H04M 1/663; H04M 2203/2066; H04M 3/42119; H04L 67/02; H04L 29/1216; G06F 17/2235

See application file for complete search history.

(56) References Cited

U.S. PATENT DOCUMENTS

| | | | |
|---|---|---|---|
| 5,732,074 | A | 3/1998 | Spaur et al. |
| 5,848,396 | A | 12/1998 | Gerace |
| 5,852,775 | A | 12/1998 | Hidary |

(Continued)

FOREIGN PATENT DOCUMENTS

| | | |
|---|---|---|
| EP | 1066867 A2 | 1/2001 |
| EP | 1066868 A2 | 1/2001 |

(Continued)

*Primary Examiner* — Nizar Sivji
(74) *Attorney, Agent, or Firm* — Christopher K. Gagne

(57) ABSTRACT

A system and method for using a wireless browser to send local information from a wireless handset to a Web server. A service request received from a handset user includes the type of local information needed to carry out the request as well as the URL address of the server. The handset confirms that the input is not a telephone number to be dialed. If the input is a telephone number, the browser is terminated and the number is dialed. Otherwise, the browser acquires the local information needed to carry out the request from the handset. The local information is appended to the URL address, which is extracted from the user input, and the browser is instructed to navigate to the URL address to provide the local information to the server.

15 Claims, 5 Drawing Sheets

Related U.S. Application Data continuation of application No. 12/028,766, filed on Feb. 8, 2008, now Pat. No. 8,078,150, which is a continuation of application No. 09/526,105, filed on Mar. 15, 2000, now Pat. No. 7,330,883.

(56) References Cited

U.S. PATENT DOCUMENTS

| | | | |
|---|---|---|---|
| 5,991,735 | A | 11/1999 | Gerace |
| 6,011,546 | A | 1/2000 | Bertram |
| 6,050,898 | A | 4/2000 | Vange et al. |
| 6,055,510 | A | 4/2000 | Henrick et al. |
| 6,108,554 | A | 8/2000 | Kawamoto |
| 6,113,494 | A | 9/2000 | Lennert |
| 6,115,754 | A | 9/2000 | Landgren |
| 6,122,520 | A | 9/2000 | Want et al. |
| 6,134,532 | A | 10/2000 | Lazarus et al. |
| 6,157,841 | A | 12/2000 | Bolduc et al. |
| 6,173,316 | B1 | 1/2001 | De Boor et al. |
| 6,181,927 | B1 | 1/2001 | Welling, Jr. et al. |
| 6,208,866 | B1 | 3/2001 | Rouhollahzadeh et al. |
| 6,216,129 | B1 | 4/2001 | Eldering |
| 6,223,291 | B1 | 4/2001 | Puhl et al. |
| 6,233,608 | B1 | 5/2001 | Laursen et al. |
| 6,256,498 | B1 | 7/2001 | Ludwig |
| 6,332,127 | B1 | 12/2001 | Bandera et al. |
| 6,609,005 | B1 | 8/2003 | Chern |
| 6,636,749 | B2 | 10/2003 | Holmes et al. |
| 6,731,612 | B1 | 5/2004 | Koss |
| 6,813,502 | B2 | 11/2004 | Son et al. |
| 7,382,871 | B1 | 6/2008 | Ure |
| 2001/0005839 | A1 | 6/2001 | Maenpaa et al. |
| 2001/0011248 | A1 | 8/2001 | Himmel et al. |
| 2001/0013037 | A1 | 8/2001 | Matsumoto |
| 2001/0014911 | A1 | 8/2001 | Doi et al. |
| 2003/0211845 | A1 | 11/2003 | Lohtia et al. |
| 2004/0102197 | A1 | 5/2004 | Dietz |
| 2008/0045274 | A1 | 2/2008 | Witkowski et al. |
| 2011/0014911 | A1 | 1/2011 | Baldemair et al. |
| 2011/0025222 | A1 | 2/2011 | Nagase et al. |

FOREIGN PATENT DOCUMENTS

| | | |
|---|---|---|
| EP | 1086732 A1 | 3/2001 |
| EP | 1087323 A1 | 3/2001 |

SYSTEM AND METHOD FOR SENDING LOCAL INFORMATION FROM A WIRELESS BROWSER TO A WEB SERVER

CROSS-REFERENCE TO RELATED APPLICATION

This application is a continuation application and claims the benefit of and priority to U.S. patent application Ser. No. 14/220,720, entitled "SYSTEM AND METHOD FOR SENDING LOCAL INFORMATION FROM A WIRELESS BROWSER TO A WEB SERVER", filed Mar. 20, 2014, which is a continuation application of U.S. patent application Ser. No. 13/316,357, entitled "SYSTEM AND METHOD FOR SENDING LOCAL INFORMATION FROM A WIRELESS BROWSER TO A WEB SERVER", filed Dec. 9, 2011, now issued as U.S. Pat. No. 8,761,740, which is a continuation application of U.S. patent application Ser. No. 12/028,766, entitled "SYSTEM AND METHOD FOR SENDING LOCAL INFORMATION FROM A WIRELESS BROWSER TO A WEB SERVER", filed Feb. 8, 2008, now issued as U.S. Pat. No. 8,078,150, which is continuation application of U.S. patent application Ser. No. 09/526,105, entitled "SYSTEM AND METHOD FOR SENDING LOCAL INFORMATION FROM A WIRELESS BROWSER TO A WEB SERVER", filed Mar. 15, 2000, now issued as U.S. Pat. No. 7,330,883, the entire contents of which are incorporated herein by reference.

BACKGROUND OF THE INVENTION

1. Field of the Invention

The present invention relates generally to wireless communications and, more particularly, relates to a system and method for sending local information from a browser of a wireless communications device to a Web server.

2. Related Art

The advent of wireless personal communications devices has revolutionized the telecommunications industry. Cellular, personal communications services ("PCS") and other services provide wireless personal communications to businesses and individuals at home, in the office, on the road, and to any other location the wireless network can reach. Wireless telephone subscribers no longer must use public telephones along the road or wait until returning to the home or office to check messages or to return important business calls. Instead, wireless subscribers can carry out day-to-day business from the privacy of an automobile, from a remote job site, while walking along the airport concourse, and anywhere else that a personal communications signal is accessible.

Thus, it is no surprise that since the introduction of the cellular telephone service, the number of wireless telephone subscribers has increased steadily. Today, there are a staggering number of wireless telephone subscribers whose ranks are growing rapidly. In fact, many households have multiple wireless telephones in addition to their conventional land line services.

With a market of this size, there is fierce competition among hardware manufacturers and service providers. In an attempt to lure customers, most providers offer handsets with desirable features or attributes such as small size, light weight, longer battery life, speed dial, and the like. Many recent additions to the marketplace include multi-functional handsets that even provide pocket organizer functions integrated into the wireless handset. Most manufacturers, however, are still scrambling to add new features to their communications devices to snare a portion of this booming market.

One way in which new features are added to wireless communication devices is by integrating the devices into the Web. Such integration allows the countless services available through the Web to be extended to wireless communications devices. Traditional web pages, however, usually contain too much information to be presented on the typically smaller display of a wireless communication device, such as a digital cellular telephone. To address this problem, new Web based programming languages such as the Handheld Device Markup Language ("HDML") have been developed to serve the wireless market. In serving the wireless market, HDML has evolved and is sometimes called the Wireless Markup Language ("WML"). This language, which will be referred to herein as HDML/WML, is part of a larger standard called the Wireless Application Protocol ("WAP"). WAP is a result of continuous work to define an industry wide standard for developing applications over wireless networks. The WAP forum was formed to create a global wireless protocol specification that works across differing wireless network technology types for adoption by appropriate industry standards bodies.

HDML/WML is a markup language intended for use in specifying content and user interfaces for narrow bandwidth ("narrowband") devices, including cellular phones, pagers, and personal digital assistants ("PDA"). HDML/WML was designed with the limitations and constraints of these narrowband, small screen devices specifically in mind. Some of these constraints include a smaller display and limited user input facilities, a narrowband network connection and limited memory and computational resources.

Though HDML syntax is similar to HTML (Hypertext Markup Language) syntax, HDML is not a true markup language. It is a set of commands or statements that specifies how a narrowband device interacts with a user. HDML applications display information on the handset display and specify how the handset responds to user input. The text presentation and layout area is tailored to the smaller display area typical to a narrowband device. A "card and deck" organizational structure is used whereby all information is organized into a collection of screen sized cards, each of which specifies a single interaction between the handset and user. A deck contains one or more cards. HDML supports several types of cards, including entry cards, which display a message and allow the user to enter a string of text; choice cards, which display multiple options from which the user can choose one; and display cards, which display information only. Inter-card navigation and linking is supported for managing navigation between cards and decks. String parameterization and state management allow the use of state models to add parameters to decks.

Today, HDML/WML offers an efficient means of providing content and services from the Web infrastructure to wireless handheld devices such as cellular phones, pagers, and PDAs.

SUMMARY OF THE INVENTION

The present invention uses the existing infrastructure of a wireless HDML/WML browser to send local information from a wireless handset to a Web server. The local information is of a type necessary to carry out a Web service requested by the handset user, such as determining the user's current location. The local information is sent to a remote Web server that carries out the requested service using the local information. If the local information is the handset GPS location, for example, the server may determine a nearby restaurant and send that information back to the user, or the server may store the handset location for retrieval by other authorized users of the server.

In one embodiment of the present invention, a method for sending local information from a wireless handset to a Web server is provided. The method comprises the following steps:

(a) receiving a service request from a user of the wireless handset, wherein the service request comprises a type of local information needed to carry out the service request;

(b) acquiring the local information; and (c) sending the local information to the Web server.

In another embodiment of the invention, a method for using a wireless browser to send local information from a wireless handset to a Web server or to dial a telephone number is provided. The method comprises the following steps:

(a) receiving an input from a user of the wireless handset, wherein the input comprises either a service request containing a type of local information needed to carry out the service request, or a telephone number to be dialed;

(b) determining whether the input comprises a service request or a telephone number;

(c) if the input is a telephone number, terminating the browser and dialing the telephone number; and (d) if the input is a service request, acquiring the local information and sending the local information to the Web server via the wireless browser.

The present invention also provides a wireless communication system comprising a wireless handset. The handset has a transceiver for sending and receiving communications across a wireless communication network and an. Internet browser. The browser is configured to accept a user input comprising either a telephone number to be dialed or a service request. If the input is a service request, it will include the type of local information needed to carry out the request and the URL address of a Web server. The Web server is in communication with the handset over the network, receives the local information from the Internet browser and carries out the service request using the local information that is received.

Other aspects and advantages of the present invention will be apparent in the following description, claims and drawings.

BRIEF DESCRIPTION OF THE DRAWINGS

The present invention is described with reference to the accompanying drawings, in which like reference numerals refer to like parts.

DETAILED DESCRIPTION OF PREFERRED EMBODIMENTS

1. Introduction and Overview

The present invention provides a system and method for sending local information from a wireless communication device having an HDML/WML browser to a Web server. The local information that is sent may be the location of the device, or other information such as map, driving, contact and/or scheduling information, or the location of retailers, goods, services, or other points of interest near the handset. The local information is sent to a remote Web server that carries out a requested service using the local information.

2. Example Environment

Figure 1:
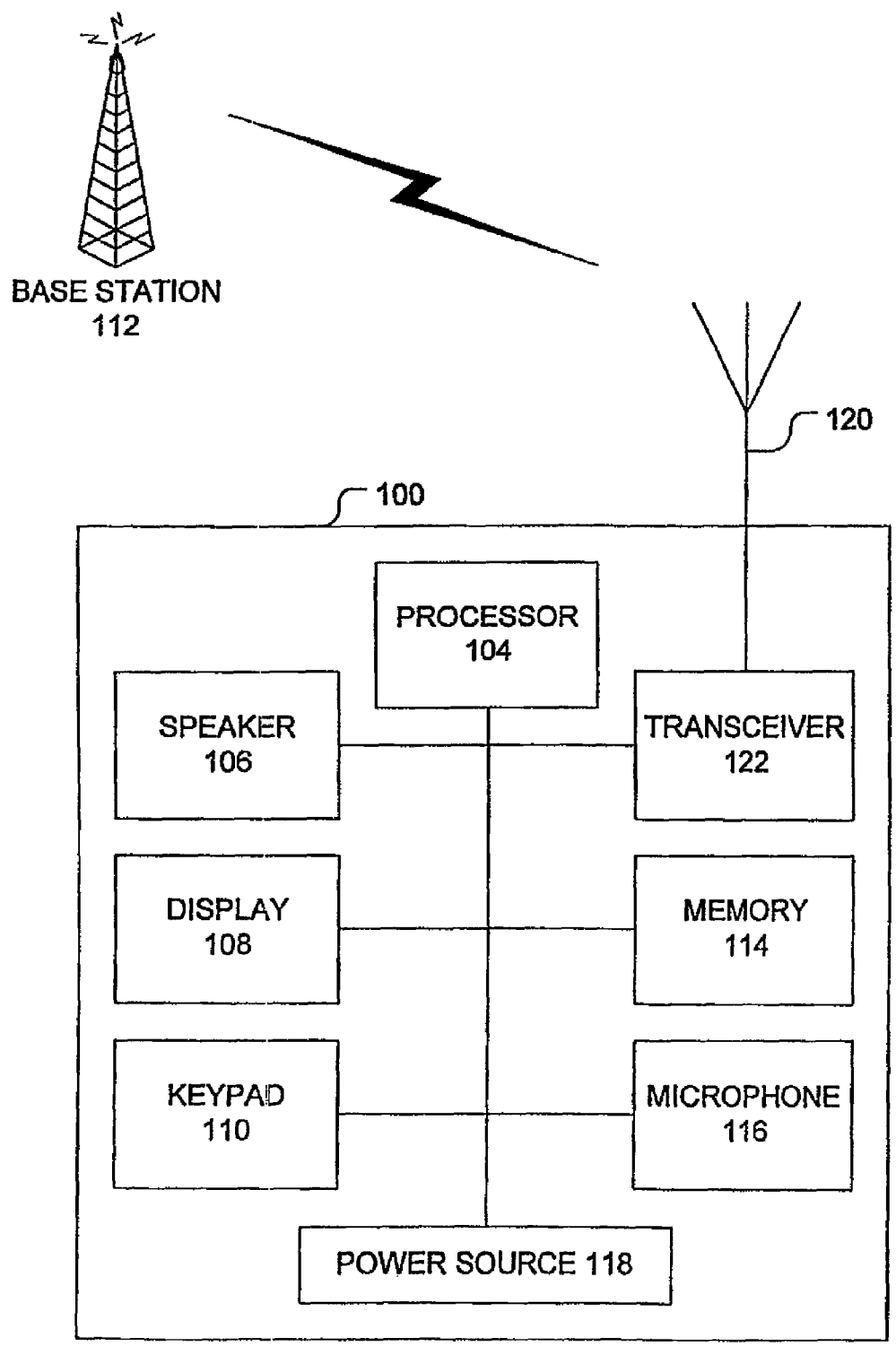
FIG. 1 is a block diagram of a wireless communication device.

Before describing the invention in detail, an example environment in which the invention can be implemented will be described. One example environment is a handset or communication device operating within a wireless communication network such as, for example, a cellular, GSM, PCS or radio communication network. One example wireless communication device (handset) 100 is illustrated in FIG. 1. Wireless communication devices embodying the present invention, however, can be implemented in various configurations and architectures. Implementation of the invention is not dependent on any particular device architecture or communication network.

Handset 100 includes processor 104, speaker 106, display 108, keypad 110, transceiver 122, memory 114, microphone 116, power source 118 and antenna 120. Handset 100 is typically a mobile unit such as a handheld cellular phone or an integrated vehicle phone. It is configured to communicate with other communications devices such as base station 112. Base station 112 is located within a geographic area known as a "cell" and handles communications for all mobile units within the cell.

Processor 104 directs the overall operation of handset 100. A computer program or set of instructions is typically coded or otherwise implemented on the processor to enable the processor to carry out the device operation. As will be described in more detail below, an Internet or World Wide Web ("Web") browser may be coded into the processor and used as the Operating system for handset 100. Memory 114 interfaces with processor 104 and may store program code and provide storage space for data useful in executing the program code and carrying out handset functions. Memory 114 may be implemented as Read Only Memory ("ROM"), Random Access Memory ("RAM") or as any other convenient memory format. The features and functionality of the invention described below may be implemented using hardware, software or a combination of hardware and software. If implemented as software, the software may run on processor 104 or be stored in memory 114.

Transceiver 122 includes a transmitter that transmits voice and data information via antenna 120 to a recipient communication device (such as base station 112), and a receiver that receives voice and data information from a transmitting communication device (such as base station 112). User interface features include speaker 106, display 108, keypad 110 and microphone 116. Microphone 116 accepts voice or other audio information from the user and converts this information into electrical signals that can be transmitted by transceiver 122. Likewise, speaker 106 converts electrical signals received by transceiver 122 into audio information that can be heard by a user of device 100. Display 108 displays information such as call information, keypad entry information, signal presence and strength information, battery life information, and other useful information. Display 108 preferably takes the form of a liquid crystal display ("LCD"), which has low power consumption characteristics, but could also be implemented as a light emitting diode ("LED") display or any other appropriate visual indicator. Keypad 110 typically includes an alphanumeric keypad and special function keys. It may be backlit to permit viewing of the keys in low light or dark conditions. A flip panel (not shown) may conceal all or a portion of keypad 110.

Power source 118 provides power to device 100. It may be implemented with rechargeable batteries, such as NiCad or NiMH rechargeable batteries, or with any other suitable power source.

3. Wireless Services Through a Web Server

Figure 2:
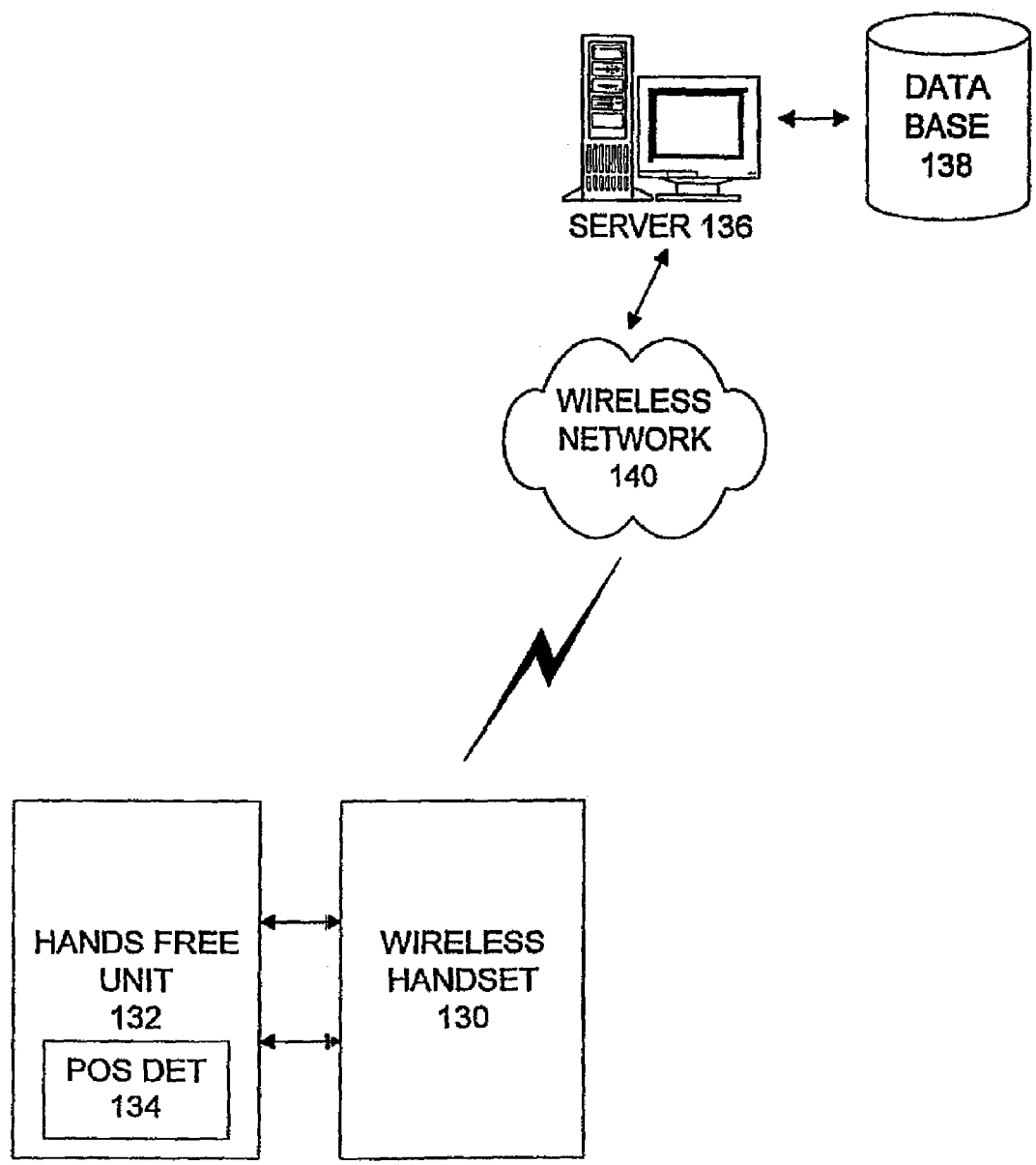
FIG. 2 is a block diagram of a wireless communication system according to the present invention.

FIG. 2 is a block diagram illustrating a wireless communication system according to the present invention. The communication system provides information to a wireless handset based on the location of the device. It includes a wireless handset 130 and a hands-free unit 132 incorporating a position determination system 134. Handset 130 can be implemented in a configuration similar to that of handset 100 of FIG. 1, or in any other device configuration that is capable of communicating with remote locations via a wireless communication medium. In the description below, "handset" refers to any communication device capable of communicating with other devices via a wireless medium.

Hands-free unit 132 is optionally provided to allow the user of handset 130 to communicate in a hands-free mode. Hands-free unit 132 may include a microphone and speaker to provide handset 130 with speakerphone-like capabilities. Such capabilities are particularly desirable where handset 130 is utilized in an automobile or other mobile situation. In one implementation, hands-free unit 132 is configured according to conventional industry standards for a "hands-free kit".

As mentioned above, hands-free unit 132 is preferably equipped with a position determination system 134 that determines the location of hands-free unit 132 and handset 130. Position determination system 134 could also be directly incorporated into handset 130. System 134 determines location in terms of parameters such as latitude, longitude, height, speed of travel, and other useful location or position parameters. In one implementation, position determination system 134 uses the Global Positioning System ("GPS") or differential GPS, the operation of which is well known to those of ordinary skill in the art. Alternative position determination systems, such as triangulation systems, may also be used.

Handset 130 preferably includes both a voice and data interface, particularly where position determination system 134 is incorporated in hands-free unit 132. The voice interface provides hands-free operation and speakerphone-like capabilities. The data interface allows location information obtained by system 134 to be provided to handset 130 for transmission over wireless network 140.

Handset 130 communicates with other entities via wireless network 140. Network 140 is typically comprised of a plurality of base stations that provide relay points for communication. Network 140 may be a cellular, PCS, GSM, or any other wireless communication network. In addition to conventional communication with other wired or wireless communication devices, as shown in FIG. 2, network 140 permits communication between handset 130 and data server(s) 136. When a user requests information, handset 130 provides the location of the handset to server 136 across wireless network 140. Server 136 retrieves relevant information from an associated database 138 and conveys the information to handset 130 over wireless network 140. The information may be displayed on the handset display or audibly rendered via speech synthesis or prerecorded scripts. Although the type of information stored in database 138 is virtually limitless, several example applications are provided for illustrative purposes.

In one example application, driving directions to a destination address are provided to handset 130. The handset user requests driving directions to the destination, and the handset relays the request to server 136 over wireless network 140. At the time of the request, the handset location is also provided to server 136 to provide a starting point for the directions. Using the handset location and the destination address, server 136 calculates a route and compiles driving directions. The driving directions are transmitted to handset 130 over network 140 and are displayed or audibly rendered to the user. In addition to textual driving directions, a map showing the route may be displayed on the handset display. Options such as the shortest possible route, interstate route, safest route, most scenic route, etc. may be provided. The user's choice of options will dictate the route calculation. The options may be stored locally and prompts or scripts generated in the memory of handset 130. Alternatively, the options, prompts and scripts may be stored at server 136 and provided to the user via network 140.

Another example application locates particular types of businesses or services in the user's location. Restaurants, gas stations, hotels and other businesses or services near the user's location can be identified and provided to the user. Again, the user requests the business or service type vocally or via keypad entry. The request is communicated to server 136 over wireless network 140, along with the user's current location as determined by the position determination system 134. Server 136, based on the handset location and user request, retrieves and returns relevant information to handset 130 over network 140.

Parameter limits or filters may be implemented to refine the request and selections returned. The user may set a location filter, for example, that requires returned selections be within a certain maximum number of miles of the user's current location. If the user is seeking a restaurant, the user may request or be prompted to select parameters that refine the search results. These parameters may include cuisine type (e.g., Italian, French, American, etc.), restaurant type (e.g., fast food, casual dining, formal, etc.), price range and so on. Additionally, for restaurants, gas stations, motels and other businesses, the user may identify a preferred national or regional chain. Alternatively, the user may have a preferences profile stored in the Web server 136 that contains this information.

As noted above, the search may be refined (the query narrowed) on the user's own initiative or based on system prompts. If the user simply requests a nearby restaurant, for example, server 136 may prompt the user with questions about parameters such as those described above. Alternatively, to conserve bandwidth over network 140, prompts can be stored locally and made by handset 130 (or hands-free unit 132) before the request is sent to server 136. In this embodiment, updated scripts and/or prompts may be downloaded from sewer 136 to handset 130. Preferably, memory-intensive data such as establishment locations, driving directions, etc. are stored in database 138 to minimize the amount of memory required in handset 130. The precise distribution of data storage among these devices will be influenced by factors such as available bandwidth, memory costs and airtime costs.

Figure 3:
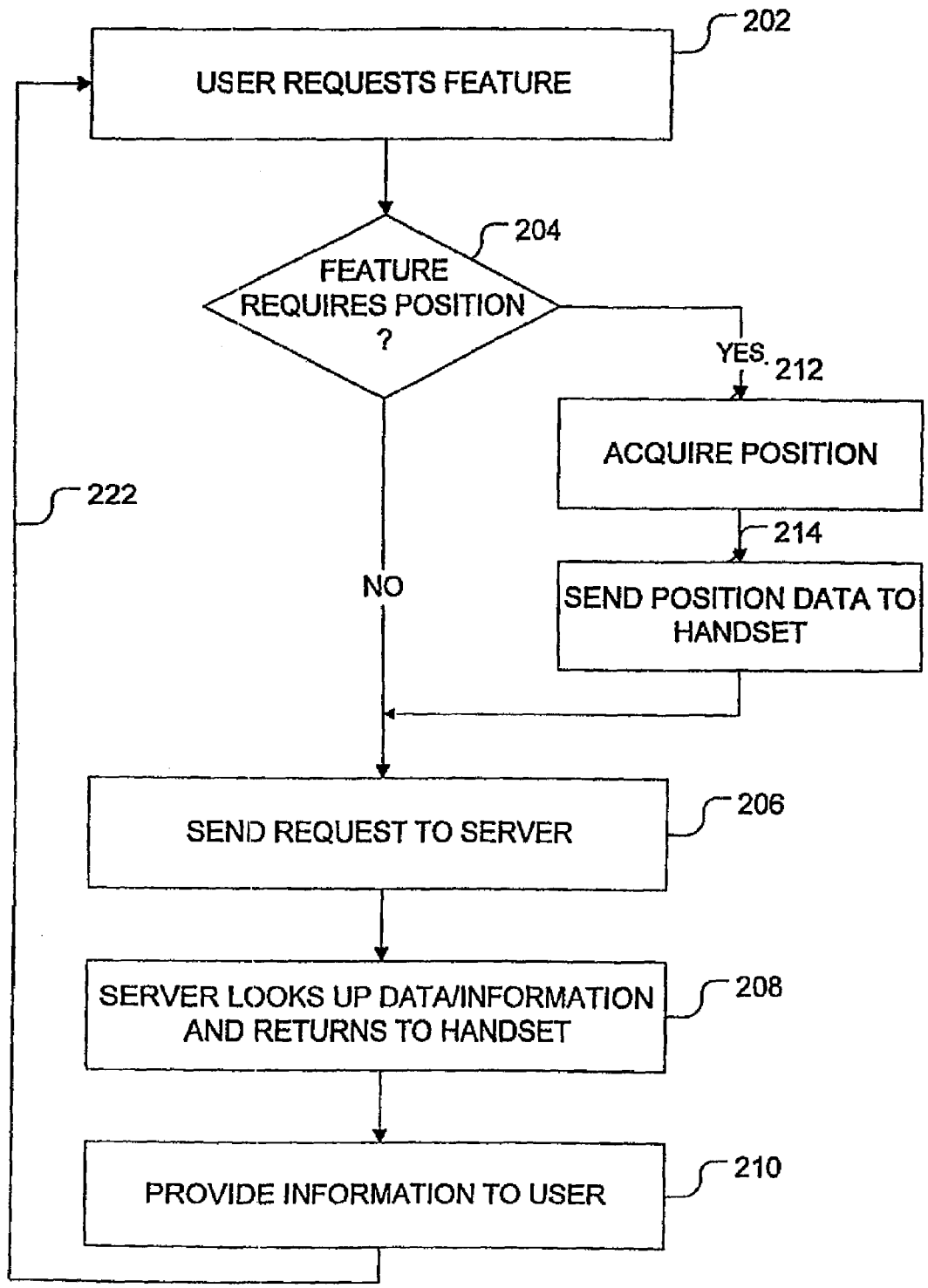
FIG. 3 is a flowchart of a method for requesting information across a wireless network according to the present invention.

A method for requesting information across network 140 is illustrated in FIG. 3. In step 202, a user initiates a request for information. In step 204, the system determines whether the request requires the handset location or position. If position information is required, the method proceeds from step 204 to step 212, where system 134 acquires the position of handset 130. If system 134 is situated in hands-free unit 132, unit 132 provides the position data to handset 130 for transmission to server 136 over wireless network 140 (step 214). If position information is not required, the method proceeds from step 204 directly to step 206.

In step 206, handset 130 sends the request to server 136 via wireless network 140. The request includes any position data acquired in steps 212-214. The present invention provides a novel method for sending the local information included in the request using an HDML/WML browser that will be described in more detail below. In step 208, server 136 retrieves the data or information requested from database 138 and communicates the data to handset 130 over network 140. In step 210, the data is displayed or provided to the user.

As described above, scripts or prompts may be provided to the user to refine the information request. If the scripts or prompts are stored in database 138 (as opposed to local storage in handset 130), they are retrieved by server 136 in step 208 and provided to the user in step 210. The user's answers to the prompts are sent by handset 130 to server 136, which uses the refined information to retrieve additional data or information from database 138, or to further refine the user's query. This potentially repetitive process is illustrated in FIG. 3 by flow line 222 and the repetition of steps 202, 206 and 208.

4. Sending Local Handset Information to a Web Server

As noted above, the present invention provides a novel method for sending local handset information to a Web server using a wireless browser. A browser, as is well known to those of ordinary skill in the art, is a software application that is used to locate and display Web pages. In one implementation, an HDML/WML browser is used as the handset operating system and handset functions are accessed through the browser. The browser presents a list of options to the user such as, for example, accessing a phone list, accessing an inbox, and so on. In accordance with the present invention, one of the presented options is use of a Web service that requires local information from the handset, such as the location of the handset. The local information is sent to a Web server by the browser by modifying the phone dialing process such that the local information is sent as part of the URL (Uniform Resource Locator).

To provide a backdrop for the present invention, the process for instructing the handset to dial a number from a launched wireless browser will first be described. First, the user launches the wireless browser. At some point during browser operation, the user provides the browser with a telephone number to be dialed. The telephone number to be dialed will be referred to as the NUMBER input field. The NUMBER field may be acquired in a variety of ways. A user may directly input the number to be dialed into the handset keypad, or may input a unique identifier that enables the number to be retrieved from memory. Alternatively, the number to be dialed may be acquired via an alphabetical search of a database of contacts maintained in the handset memory. Once the NUMBER field is acquired, the web browser displays the number on the handset display and asks for affirmation from the user that the displayed number is the number that should be dialed. The user may affirm the displayed number by selecting an "OK" option, pressing an "OK" button or the like. Once the user has affirmed the number to be dialed, the browser executes a "Call" function using the telephone number as the variable input. At this point, the handset ends the browser application and initiates the dialing process.

Figure 4:
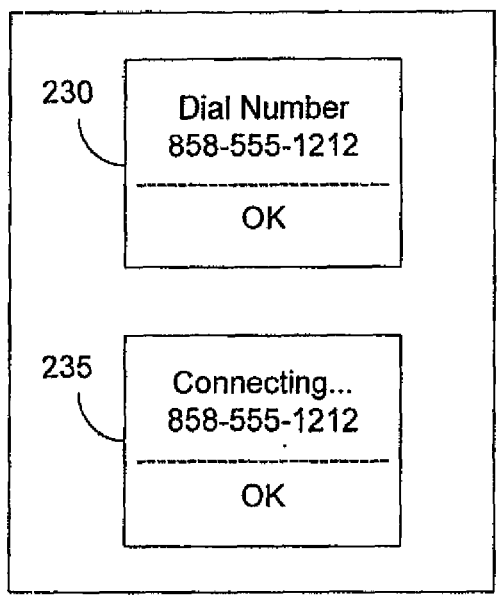
FIG. 4 is a diagram of a handset display depicting a sample set of HDML/WML interface cards for dialing a telephone number.

As noted above, HDML/WML uses a "card and deck" organizational structure whereby all information is organized into a collection of screen sized cards, each of which specifies a single interaction between the handset and user. FIG. 4 depicts a sequence of HDML/WML user interface cards 230 and 235 as displayed to the user during the dialing process described above. First interface card 230 displays the number that the user wants to dial ("858-555-1212") and requests affirmation from the user ("OK"). Second interface card 235 displays the status of handset 100 during the connection process as well as the telephone number that the handset is attempting to connect with. An example of an HDML/WML code section associated with card 230 is set forth below:

```
<HDML VERSION=3.0>
    <DISPLAY>
        <ACTION TYPE=ACCEPT LABEL=OK
        TASK=CALL NUMBER=858-555-1212>
        Dial Number
        <BR>858-555-1212
    </DISPLAY>
</HDML>
```

The first line of code defines the header of the HDML deck. All HDML decks must begin with an <HDML> tag and end with an </HDML> tag (line 6). The second line of code defines the header of the display card. Like HDML decks, cards require beginning (<DISPLAY>) and ending tags (</DISPLAY>). The third line of code defines an action, which specifies what the handset should do when the user presses a specified function key. The TYPE=ACCEPT portion identifies the function key, in this case the ACCEPT key, and the LABEL=OK portion instructs the browser to apply an "OK" label to the ACCEPT key, thereby inviting the user to press the ACCEPT key in order to proceed. The TASK=CALL specifies what the handset should do when the user presses the ACCEPT key, in this case, switch the handset to voice mode and call the number specified in the NUMBER option, which is NUMBER=858-555-1212.

Lines 4 and 5 provide the text that is displayed on the handset display (card 230). "Dial Number" is displayed in a first text line, and "858-555-1212" is displayed in a second text line. The <BR> command preceding line 5 instructs the browser to start a new line of text. The "OK" text appears because of the LABEL=OK portion of line 3. When the handset user presses the ACCEPT button to accept the "OK" option on card 220, the HDML/WML browser executes the "Call" task, using the 858-555-1212 telephone number as a variable input. The browser application is terminated and the phone number is dialed. In this fashion, a user is able to dial a phone number directly from the HDML/WML browser.

Figure 6:
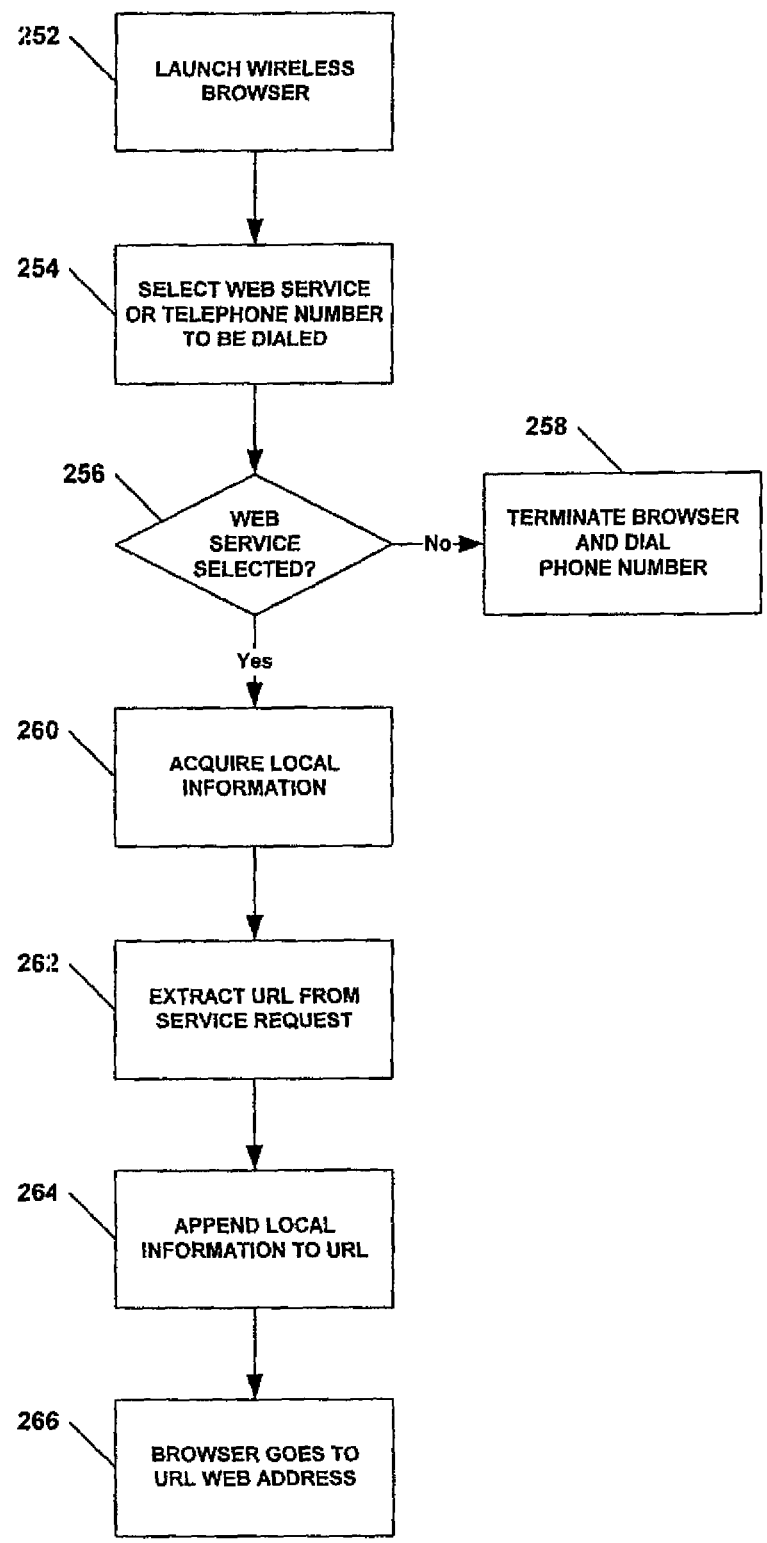
FIG. 6 is a flowchart of a method for sending information across a wireless network to a Web server according to the present invention.

The present invention modifies this existing HDML/WML infrastructure to permit local information to be sent from the handset to a Web server using the browser. FIG. 6 is a flowchart illustrating a method 250 for sending local information to a Web server from a wireless handset. In the context of the method for requesting information across a wireless network 140 illustrated in FIG. 3, method 250 would be carried out in step 206.

In step 252, the handset user launches the wireless browser application. In an implementation where the browser acts as the handset operating system, step 252 may occur automatically (without user action). In step 254, the user selects either a web service or a telephone number to be dialed. The user's selection is entered into the variable input portion of the NUMBER=xxxx instruction in the HDML/WML code set forth above. Where a telephone number to be dialed is selected, the telephone number is inserted into the NUMBER field. Where a web service is selected, a local information type indicator, followed by the URL, is entered into the number field. "GPS", for example, may be used to indicate that local information comprising the location of the handset is required. Hence, the user selects a browser option such as "Display my Current Location", the browser may enter "GPShttp://www.myaladdin.com/NP?" into the NUMBER field, wherein "GPS" indicates the local information type required, and "http://www.myaladdin.com/NP?" is the URL address.

At decision node 256, the handset determines whether the user has selected a Web service requiring local information or a telephone number to be dialed. In one implementation, the browser accomplishes this by determining whether the NUMBER variable input has an information type field (i.e., "GPS"). In another implementation, the browser may determine whether the NUMBER variable input includes a URL address. If the user has selected a number to be dialed, the method proceeds to step 258 and the browser dials the number as described above. The "Call" function is executed to terminate the browser and dial the phone number.

If, at node 256, the handset determines that the user has selected a Web service requiring local information, the method proceeds to step 260. In step 260, the browser acquires the local information necessary to carry out the request. If the service requested is the user's current location, for example, the browser will acquire the current GPS data from position determination device 134. Other types of local information may include user preferences, schedule, contact information and so on. In step 262, the handset extracts the URL from the service request (the NUMBER input). Typically, the URL will be the address of a Web server that will carry out the information request. The local information acquired by the browser is appended to the URL address in step 264 and, in step 266, the handset instructs the browser to go to the URL address rather than terminating the browser and dialing the number in the NUMBER field. Where the handset location has been requested, for example, the URL address with local information appended may be "http://myaladdin.com/NP?Iong=111.1111&lat=222.2222&time=<string(URL encoding format)>". Hence, the browser is able to proceed to the server addressed by the URL and provide the server with the local information (appended to the URL) that is necessary to carry out the request. Once the server has the local information, it will carry out the request and communicate the results to the handset (steps 208 and 210 of FIG. 3).

Figure 5:
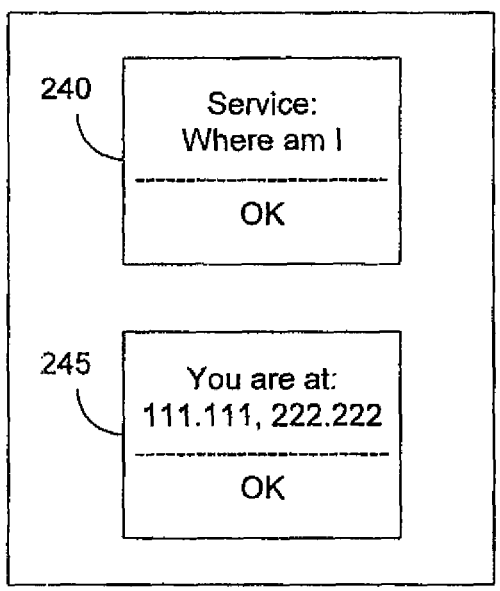
FIG. 5 is a diagram of a handset display depicting a set of HDML/WML interface cards for sending local information from a wireless handset to a Web server.

An example of an HDML/WML code section associated with displaying a card 240 (FIG. 5) for the Web service "Where am I?" is set forth below:

```
<HDML VERSION=3.0>
  <DISPLAY>
    <ACTION TYPE=ACCEPT LABEL=OK TASK-CALL
    NUMBER=GPShttp://www.myaladdin.com/NP?>
    Service
    <BR>Where am I
  </DISPLAY>
</HDML>
```

As can be seen, this code section is similar to the code section for the dialing of a phone number. The variable NUMBER field in the third line, however, is the URL address of a server preceded by an information type field. This will indicate to the handset that rather than terminating the browser and dialing the number, it should acquire the local information, append it to the URL, and proceed to the URL (steps 260-266 of method 250). The fourth and fifth lines of code display text associated with the locator service, rather than the dial number function.

The system and method described above may be implemented as computer programs, software or hardware or a combination of hardware and software, and may be implemented in a computing system having one or more processors. The HDML/WML code that controls the wireless web browser, for example, may be coded in processor 104 or stored in memory 114. Alternatively, the program or portions of it could be stored on server 136 and downloaded to handset 130 as needed.

Various embodiments of a system and method for sending local information from a wireless communications device to a web server have been described herein. These embodiments are presented for exemplary purposes only, however, and are not intended to limit the scope of the invention, which is defined by the following claims and their equivalents.

The invention claimed is:

1. A wireless device to communicate with a web server over a wireless communication network, comprising:
    a processor to execute program code comprising a user interface to enable a user to enter a user input in an input field, wherein the user input comprises either a telephone number to be dialed or a service request that includes a location information type indicator corresponding to a type of local information carrying out the service request; and
    a transceiver to send and receive communications over the wireless communication network, wherein the processor is further to determine whether the user input is the service request or the telephone number to be dialed,
    wherein when the user input is information for a service request, the service request to be sent including local information specifying a location of the wireless device, wherein the service request corresponds to a browser command that identifies the location and a web address of the web server, wherein the browser command is parsed to determine a portion of the user input that corresponds to the service request,
    wherein the device comprises an integrated phone, wherein the service request further comprises a set of options including a route calculation, wherein the route calculation to dictate one or more of the location type, a shortest possible route, an interstate route, a safest route, and a most scenic route, and
    wherein when the user input comprises a telephone number to be dialed, the device is to display the telephone number and allow the user to confirm that the number is to be dialed.

2. The device of claim 1, wherein the device comprises a hand held cellular phone, wherein the location information is sent as part of the web address, wherein the location information includes driving directions generated based on the route calculation, wherein the driving directions include a driving route starting from an origination point and ending at a destination point, and wherein the set of options further includes one or more parameter filters to refine one or more selections of the service request, wherein the one or more selections include one or more of geographical ranges, distance limits, preferable service types, and maximum or minimum price caps.

3. The device of claim 1, wherein the user input is to be entered into a NUMBER field, and program code is further to determine whether the NUMBER field includes a local information type.

4. The device of claim 1, wherein the user input it to be entered into a NUMBER field, and program code is further to determine whether the NUMBER field includes a URL address.

5. The device of claim 1, wherein the local information specifying a location comprises the Global Positioning Service (GPS) position of the device.

6. A method for a wireless device to communicate with a web server over a wireless communication network, comprising:

enabling a user to enter a user input in an input field in a user interface, wherein the user input comprises one of a telephone number to be dialed or a service request that includes a location information type indicator corresponding to a type of local information carrying out the service request;

determining whether the user input is the service request or the telephone number to be dialed, wherein when the user input is information for a service request, sending the service request with local information specifying a location of the wireless device, wherein the service request corresponds to a browser command that identifies the location and a web address of the web server, wherein the browser command is parsed to determine a portion of the user input that corresponds to the service request, wherein the device comprises an integrated phone, wherein the service request further comprises a set of options including a route calculation, wherein the route calculation to dictate one or more of the location type, a shortest possible route, an interstate route, a safest route, and a most scenic route, and wherein when the user input comprises a telephone number to be dialed, displaying the telephone number in the user interface to allow the user to confirm that the number is to be dialed.

7. The method as recited in claim 6, wherein the user input is to be entered into a NUMBER field, and determining further comprises determining whether the NUMBER field includes a local information type.

8. The method as recited in claim 6, wherein the user input is to be entered into a NUMBER field, and determining further comprises determining whether the NUMBER field includes a URL address.

9. The method as recited in claim 6, wherein the local information specifying a location comprises the Global Positioning Service (GPS) position of the device.

10. The method of claim 6, wherein the device comprises a hand held cellular phone, wherein the location information is sent as part of the web address, wherein the location information includes driving directions generated based on the route calculation, wherein the driving directions include a driving route starting from an origination point and ending at a destination point, and wherein the set of options further includes one or more parameter filters to refine one or more selections of the service request, wherein the one or more selections include one or more of geographical ranges, distance limits, preferable service types, and maximum or minimum price caps.

11. At least one non-transitory computer readable storage medium having instructions stored thereon, the instructions when executed on a wireless device cause the device to:

enable a user to enter a user input in an input field in a user interface, wherein the user input comprises one of a telephone number to be dialed or a service request that includes a location information type indicator corresponding to a type of local information carrying out the service request;

determine whether the user input is the service request or the telephone number to be dialed, wherein when the user input is information for a service request, send the service request with local information specifying a location of the wireless device, wherein the service request corresponds to a browser command that identifies the location and a web address of the web server, wherein the browser command is parsed to determine a portion of the user input that corresponds to the service request, wherein the device comprises an integrated phone, wherein the service request further comprises a set of options including a route calculation, wherein the route calculation to dictate one or more of the location type, a shortest possible route, an interstate route, a safest route, and a most scenic route, and wherein when the user input comprises a telephone number to be dialed, display the telephone number in the user interface to allow the user to confirm that the number is to be dialed.

12. The non-transitory medium as recited in claim 11, wherein the user input is to be entered into a NUMBER field, and further comprising instructions to determine whether the NUMBER field includes a local information type.

13. The non-transitory medium as recited in claim 11, wherein the user input is to be entered into a NUMBER field, and further comprising instructions to determine whether the NUMBER field includes a URL address.

14. The non-transitory medium as recited in claim 11, wherein the local information specifying a location comprises the Global Positioning Service (GPS) position of the wireless device.

15. The non-transitory medium of claim 11, wherein the device comprises a hand held cellular phone, wherein the location information is sent as part of the web address, wherein the location information includes driving directions generated based on the route calculation, wherein the driving directions include a driving route starting from an origination point and ending at a destination point, and wherein the set of options further includes one or more parameter filters to refine one or more selections of the service request, wherein the one or more selections include one or more of geographical ranges, distance limits, preferable service types, and maximum or minimum price caps.

* * * * *